United States Patent
Hachiya

(10) Patent No.: US 7,723,971 B2
(45) Date of Patent: May 25, 2010

(54) POWER SUPPLY

(75) Inventor: Shogo Hachiya, Kitakyushu (JP)

(73) Assignee: Rohm Co., Ltd. (JP)

( * ) Notice: Subject to any disclaimer, the term of this patent is extended or adjusted under 35 U.S.C. 154(b) by 466 days.

(21) Appl. No.: 11/659,940

(22) PCT Filed: Aug. 4, 2005

(86) PCT No.: PCT/JP2005/014288

§ 371 (c)(1),
(2), (4) Date: Feb. 9, 2007

(87) PCT Pub. No.: WO2006/016516

PCT Pub. Date: Feb. 16, 2006

(65) Prior Publication Data

US 2007/0290666 A1  Dec. 20, 2007

(30) Foreign Application Priority Data

Aug. 11, 2004  (JP)  ............................. 2004-234109

(51) Int. Cl.
*G05F 1/00*  (2006.01)
(52) U.S. Cl. .................................... 323/282
(58) Field of Classification Search ................ 323/282, 323/284, 901; 361/18
See application file for complete search history.

(56) References Cited

U.S. PATENT DOCUMENTS

| 5,528,132 | A | 6/1996 | Doluca |
| 6,166,562 | A * | 12/2000 | Mita et al. ..................... 326/83 |
| 6,611,132 | B2 * | 8/2003 | Nakagawa et al. .......... 323/284 |
| 6,943,533 | B2 * | 9/2005 | Okuno ........................ 323/282 |
| 2004/0037094 | A1 * | 2/2004 | Muegge et al. ............ 363/21.16 |
| 2004/0100240 | A1 * | 5/2004 | Natsume et al. ............. 323/282 |

FOREIGN PATENT DOCUMENTS

| JP | 56-27544 Y2 | 7/1981 |
| JP | 61-69370 | 4/1986 |
| JP | 62-77865 A | 4/1987 |
| JP | 2-155463 A | 6/1990 |
| JP | 3-18684 U | 2/1991 |
| JP | 4-49852 A | 2/1992 |
| JP | 9-56158 A | 2/1997 |

(Continued)

OTHER PUBLICATIONS

Hisashi, machine translation of publication No. JP 11-168878, publication date Jun. 22, 1999, all pages.*

(Continued)

*Primary Examiner*—Bao Q Vu
*Assistant Examiner*—Jue Zhang
(74) *Attorney, Agent, or Firm*—Cantor Colburn LLP

(57) ABSTRACT

A power supply apparatus includes a switching regulator, a linear regulator, a timer circuit, a control circuit, an inverter, and a switch. The power supply apparatus is a step-down type DC-DC converter which steps down an input voltage inputted to an input terminal and then outputs an output voltage, which has been stepped down, to an output terminal. The timer circuit counts the time elapsed from when a start of the power supply apparatus is instructed by a control signal, and sets an output signal to a high level at a lapse of a predetermined time. When the output signal goes to the high level, the switch turns on and the output voltage is supplied to a power supply terminal of the control circuit.

14 Claims, 4 Drawing Sheets

FOREIGN PATENT DOCUMENTS

| | | | |
|---|---|---|---|
| JP | 10028374 A | * | 1/1998 |
| JP | 10-191625 A | | 7/1998 |
| JP | 11-168878 | | 6/1999 |
| JP | 2004-166319 A | | 6/2004 |
| JP | 2004-173460 | | 6/2004 |
| TW | 525337 | | 3/2003 |
| TW | 529235 | | 4/2003 |
| TW | 595829 | | 6/2004 |

OTHER PUBLICATIONS

Masahiro et. al, machine translation of publication No. JP 2004-173460, publication date Jun. 17, 2004, all pages.*

International Search Report for International Application No. PCT/JP2005/014288 mailed Sep. 27, 2005.

Chinese Office Action for Application No. 2005-80020754.2 (with English Translation) mailed Apr. 4, 2008.

Written Opinion of the International Searching Authority for International Application No. PCT/JP2005/014288 with English translation mailed Feb. 13, 2007.

Taiwanese Office Action for Taiwanese Patent Application 094127249 dated Dec. 31, 2009 with English Translation.

Japanese Office Action for Japanese Patent Application No. 2004-234109 dated Jan. 26, 2010 with English Translation.

* cited by examiner

POWER SUPPLY

CROSS REFERENCE TO RELATED APPLICATIONS

This is a U.S. national stage of application No. PCT/JP2005/014288, filed on 4 Aug. 2005. Priority under 35 U.S.C. §119(a) and 35 U.S.C. §365(b) is claimed from Japanese Application No. 2004-234109, filed 11 Aug. 2004, the disclosure of which is also incorporated herein by reference.

BACKGROUND OF THE INVENTION

1. Field of the Invention

The present invention relates to a power supply apparatus and it particularly relates to a switching regulator.

2. Description of the Related Art

Inside a variety of electronic apparatuses, DC-DC converters, such as step-down type switching regulators and the like, are widely used to supply proper voltage to electronic circuits used therein. For example, when a voltage of 20 V only is available in an electronic apparatus and an electronic circuit therein is in need of 5 V voltage, the electronic circuit is driven by stepping down the 20 V to 5 V with a step-down type switching regulator.

The switching regulator like this has a control circuit for controlling the ON and OFF operations of the switching transistor. However, for a stable operation of the switching regulator, it is a matter of course that the supply voltage for the operation of the control circuit needs to be supplied stably. Now, if the supply voltage necessary for the operation of the control circuit is 5 V, then the 20 V prepared by the electronic apparatus cannot be used directly, so that a conceivable method is to generate the 5 V by a linear regulator. However, there has been a problem that the generally poor efficiency of a linear regulator leads to a worsened efficiency of the switching regulator as a whole.

To solve problems like this, a technology for using the voltage stepped down by a switching regulator as the supply voltage to drive the control circuit has been proposed (Patent Document 1). According to this technology, a voltage capable of driving the control circuit is used as a threshold value, and switching is made such that when the output voltage of the switching regulator is higher than the threshold voltage, the control circuit is driven by the output voltage, and when the output voltage of the switching regulator is lower than the threshold voltage, the control circuit is driven by a linear regulator. According to this technology, the power conversion efficiency of the switching regulator is higher than that of the linear regulator, so that a higher efficiency can be realized during the period when the supply voltage of the control circuit is supplied from the output voltage of the switching regulator.

Patent Document 1]
U.S. Pat. No. 5,528,132 (specification)

Nevertheless, the technology as described in the above-mentioned document has had a problem that when there is a variation of the output voltage of the switching regulator in the neighborhood of the threshold voltage, it is not stably determined which of the voltage of the linear regulator or the output voltage the supply voltage of the control circuit is supplied from. There is another problem that there is overshoot or undershoot of output voltage at the starting of the switching regulator, which causes erroneous operation of the circuit when the output voltage above a certain level of voltage is used as the supply voltage of the control circuit.

SUMMARY OF THE INVENTION

The present invention has been made in view of the foregoing problems, and a general purpose thereof is to provide a switching regulator capable of realizing a stable operation of the circuit while maintaining a high efficiency.

One embodiment of the present invention relates to a power supply apparatus. This power supply apparatus comprises: a switching regulator which coverts an input voltage to a desired output voltage by a switching operation of a switching transistor and outputs the voltage; a control unit which controls the switching operation of the switching transistor; a voltage generation circuit which supplies a supply voltage to drive the control unit, to the control unit; and a timer circuit which measures time elapsed from a start of operation of the switching transistor and which varies an output thereof when a predetermined period of time has elapsed. The control unit is driven by the supply voltage supplied from the voltage generation circuit during a period before the output of the timer circuit changes, whereas the control unit is driven by the output voltage of the switching regulator during a period after the output of the timer circuit has changed.

According to this embodiment, during a period before a predetermined period of time has elapsed, the control circuit is driven by the stable supply voltage supplied from the voltage generation circuit and thereby the power supply apparatus can be operated stably. During a period after the predetermined period of time has elapsed, the output voltage of the switching regulator is used as a drive voltage for the control circuit, so that a high efficiency can be ensured.

The predetermined period of time measured by the timer circuit may be determined in relation to a period required until when the output voltage of the switching regulator becomes stable.

At a start of the switching regulator, the control circuit is driven by the voltage generation circuit during a period when the output voltage is unstable; and after the output voltage of the switching regulator becomes sufficiently stabilized, the control circuit is driven by the output voltage thereof. Thus, the power supply apparatus can be operated more stably.

The voltage generation circuit may be a linear regulator that steps down the input voltage and outputs it. Since the linear regulator can be structured simply, this embodiment is advantageous in terms of cost and area.

The power supply apparatus may further comprise an error detection circuit which detects an error in circuit operation. When the error is detected by the error detection circuit, the control unit may be driven by the supply voltage supplied from the voltage generation circuit.

The "error in circuit operation" represents a state, where the power supply apparatus deviates from the stable operation, such as the overvoltage of output voltage, the overcurrent of output current and the overheating errors. If a malfunction occurs during a period when the control circuit is driven by the output voltage of the switching regulator after the switching regulator has been activated and a predetermined period of time has elapsed, it is switched again to the drive by the voltage generation circuit. Hence the switching regulator can be operated more stably.

Another embodiment of the present invention relates also to a power supply apparatus. This apparatus is a power supply apparatus that generates a stabilized output voltage, and it is such that voltage driving the power supply apparatus is supplied from an output voltage of the power supply apparatus itself in a first mode where it is assumed that the output voltage of the power supply apparatus is in a steady state, whereas the voltage is supplied from the voltage generation circuit in a second mode where it is assumed that the output voltage of the power supply apparatus in a transitional state. The first mode and the second mode are switched after a predetermined period of time has elapsed from a start of the power supply apparatus.

In order that the output voltage can be used as a voltage to drive the power supply apparatus itself, the output voltage must be stable. Thus, the stable voltage supplied from the voltage generation circuit is used in a transient state where the output voltage is unstable. Whether the state is a transient state or steady state may be determined by whether a predetermined period of time has elapsed from a start of the power supply apparatus or not. And a duration before the predetermined period of time has elapsed may be related to the second mode so as to switch the supply source of drive voltage for the power supply apparatus.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
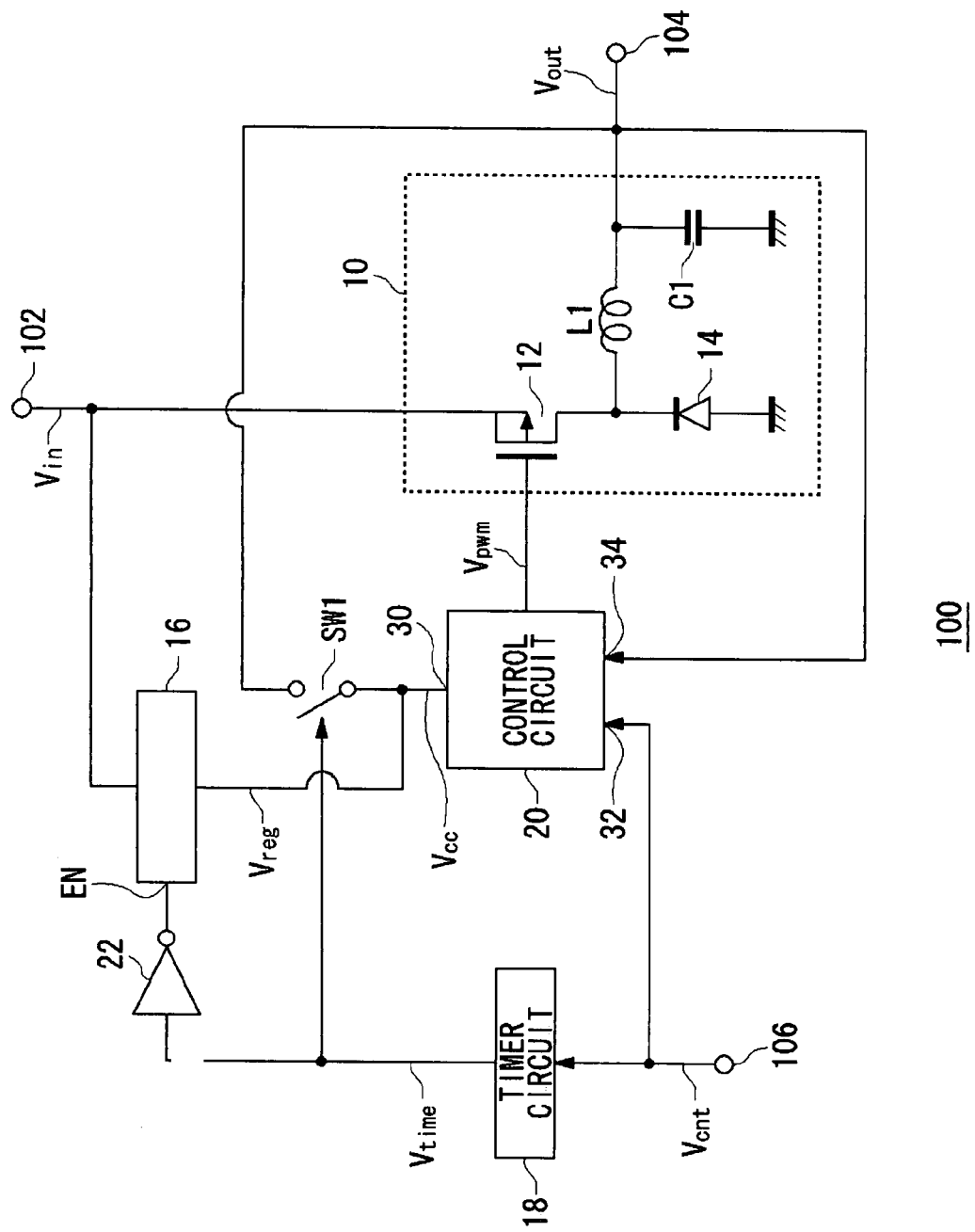
FIG. 1 shows a structure of a power supply apparatus according to a first embodiment of the present invention.

FIG. 1 shows a structure of a power supply apparatus 100 according to an embodiment of the present invention. In the subsequent figures, the same components as those in FIG. 1 will be denoted with the same reference numerals, and the description thereof will be omitted as appropriate.

The power supply apparatus 100 according to the present embodiment includes a switching regulator 10, a linear regulator 16, a timer circuit 18, a control circuit 20, and an inverter 22, and a switch SW1. The power supply apparatus 100 is provided with an input terminal 102, an output terminal 104, and a control terminal 106, and the voltages applied to or occurring at these terminals are called the input voltage Vin, the output voltage Vout, and the control voltage Vcnt, respectively.

This power supply apparatus 100 is a step-down type DC-DC converter which steps down the input voltage Vin inputted to the input terminal 102 and outputs the output voltage Vout to the output terminal 104.

The switching regulator 10 includes a switching transistor 12, an inductor L1, a capacitor C1, and a rectifying diode 14. The switching transistor 12 is a MOSFET, and the ON and OFF operations thereof are controlled by the voltage at the gate terminal thereof. In the switching regulator 10, a current is supplied to the inductor L1 alternately from the switching transistor 12 or the rectifying diode 14 by the ON-OFF operation of the switching transistor 12, so that the input voltage Vin is stepped down. The inductor L1 and the capacitor C1 constitute a low-pass filter to smooth the output voltage Vout.

The control circuit 20 outputs a pulse-width modulation signal Vpwm (hereinafter referred to as a PWM signal) for controlling the ON and OFF of the switching operation to the gate terminal of the switching transistor 12. The PWM signal Vpwm, which is a signal repeating high level and low level alternately, brings the output voltage Vout closer to a desired voltage by controlling the ON and the OFF time of the switching transistor 12 by changing the high level period and the low level period.

A control signal Vcnt is inputted to the terminal 32 of the control circuit 20, and when the control signal Vcnt is at high level, a PWM signal Vpwm is generated to control the switching of the switching transistor 12 and when the control signal Vcnt is at low level, the generation of the PWM signal Vpwm is stopped to halt the switching operation of the switching transistor 12.

Further, the control circuit 20 is provided with a feedback terminal 34, and the output voltage Vout of the switching regulator 10 is fed back to this feedback terminal 34. The control circuit 20 controls the duty ratio of the PWM signal Vpwm in such a manner as to bring the fed-back output voltage Vout closer to a predetermined voltage value.

The control circuit 20 is driven by a supply voltage Vcc applied to a power supply terminal 30. The supply voltage Vcc applied to the power supply terminal 30 of the control circuit 20 is supplied through two paths. The first supply path is the linear regulator 16, and the second supply path is the switching regulator 10 driven by the control circuit 20.

The linear regulator 16 is provided between the input terminal 102 and the power supply terminal 30 of the control circuit 20. This linear regulator 16 supplies a drive voltage Vreg appropriate and stable to drive the control circuit 20 by stepping down the input voltage Vin applied to the input terminal 102.

The linear regulator 16, which is provided with an enable terminal EN, outputs a drive voltage Vreg of the control circuit 20 when a high level is inputted thereto and stops the operation when a low level is inputted thereto. When a high level is inputted to the enable terminal EN of the linear regulator 16, the supply voltage Vcc given to the control circuit 20 is Vreg (Vcc=Vreg).

The switch SW1 is provided between the output terminal 104 and the power supply terminal 30 of the control circuit 20. When the switch SW1 turns on, an output voltage Vout is applied to the power supply terminal 30 of the control circuit 20 and the supply voltage Vcc will be Vout (Vcc=Vout). When the switch SW1 turns off, the output terminal 104 is separated off.

The timer circuit 18 has a control signal Vcnt inputted thereto. The timer circuit 18 counts the time elapsed from when the control signal Vcnt has switched to high level and at a lapse of a predetermined time Tp raises the output signal Vtime to a high level. It is preferable that this predetermined time Tp is set longer than the time from the start of the power supply apparatus 100, namely the switching operation start of the switching transistor 12, till the stabilization of the output voltage Vout.

The output signal Vtime of the timer circuit 18 is outputted to the switch SW1 to control the ON and OFF thereof. The switch SW1 turns on when the output signal Vtime is at high level and turns off when it is at low level. The inverter 22, which is provided between the timer circuit 18 and the enable terminal EN of the linear regulator 16, inverts the output signal Vtime of the timer circuit 18 and inputs it to the enable terminal EN.

Hence, either the voltage Vreg generated by the linear regulator 16 or the output voltage Vout stepped down by the switching regulator 10 is applied to the power supply terminal 30 of the control circuit 20, according to the output of the timer circuit 18.

An operation of the power supply apparatus 100 configured as above will be described hereinbelow.

Firstly, in order to clarify the technical merits of the present invention, a description is given of a case where an output voltage Vout is applied to the power supply terminal 30 of the control circuit 20 when the output voltage Vout is higher than a predetermined threshold voltage Vth and a voltage Vreg generated by the linear regulator 16 is applied thereto when it is lower than the threshold voltage Vth, without using the timer circuit 18.

Figure 2A:
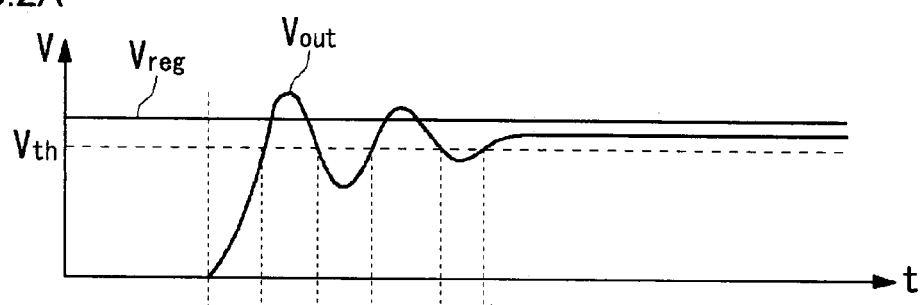
FIGS. 2A and 2B each show a temporal waveform of voltage at each terminal when a timer circuit is not used in the power supply apparatus of FIG. 1.

FIG. 2A shows the temporal waveforms of the output Vreg of the linear regulator 16 and the output voltage Vout of the switching regulator 10 at the starting of a power supply apparatus at this time. Whereas the output Vreg of the linear regulator 16 is stabilized, the output voltage Vout of the switching regulator 10 overshoots at the time of starting and then approaches a predetermined voltage, accompanied by ringing.

Figure 2B:

FIG. 2B shows a temporal waveform of a supply voltage Vcc applied to the power supply terminal 30 of the control circuit 20. As mentioned above, the supply voltage Vcc is switched by a comparison between the output voltage Vout and the predetermined threshold voltage Vth. That is, Vcc=Vout while the output voltage Vout>Vth, and Vcc=Vreg while Vout<Vth.

When the supply voltage Vcc of the control circuit 20 is switched by the threshold voltage, the supply voltage Vcc of the control circuit 20 becomes discontinuous the moment the switching occurs. Especially when a overshooting or ringing has occurred to the output voltage Vout at the starting, there is a possibility of the circuit operation becoming unstable due to the frequent switching of the supply voltage Vcc by the two supply voltages. When the threshold voltage Vth is brought closer to the output Vreg of the linear regulator 16 in order to reduce the discontinuity of the supply voltage Vcc due to the switching between the two voltage sources, the discontinuity of voltage due to switching may be reduced, but there may sometimes arise cases undesirable from the viewpoint of stable operation of the circuit because the two voltages Vreg and Vout will be switched frequently therebetween along with slight variations in the output voltage Vout.

Next, a description is given of an operation when the supply voltage Vcc of the control circuit 20 is switched according to the output of the timer circuit 18 in a power supply apparatus 100 according to the present embodiment, by referring to FIGS. 3A to 3D. FIGS. 3A to 3D show the temporal waveforms of the voltages at the respective terminals of the power supply apparatus 100.

From time T0 to time T1, the control signal Vcnt is at low level and the control circuit 20 is stopped, so that the output voltage Vout is 0 V. The output signal Vtime of the timer circuit 18 is also at low level.

When the output signal Vtime of the timer circuit 18 is at low level, the switch SW1 is off. Since the output signal Vtime, which has been inverted by the inverter 22, is inputted at high level to the enable terminal EN of the linear regulator 16, a fixed voltage Vreg is outputted from the linear regulator 16. Accordingly, during the period from time T0 to time T1, a fixed voltage Vreg supplied from the linear regulator 16 is applied to the power supply terminal 30 of the control circuit 20.

At time T1, the control signal Vcnt is switched from low level to high level in order to start the power supply apparatus 100 and raise the output voltage Vout. As the control signal Vcnt becomes a high level, the control circuit 20 starts the generation of a PWM signal Vpwm, thus starting the switching operation of the switching transistor 12.

With the switching operation of the switching transistor 12, the output voltage Vout of the switching regulator 10 begins rising. The output voltage Vout, as shown in FIG. 2A, overshoots and then approaches a predetermined voltage, accompanied by ringing.

Figure 3A:
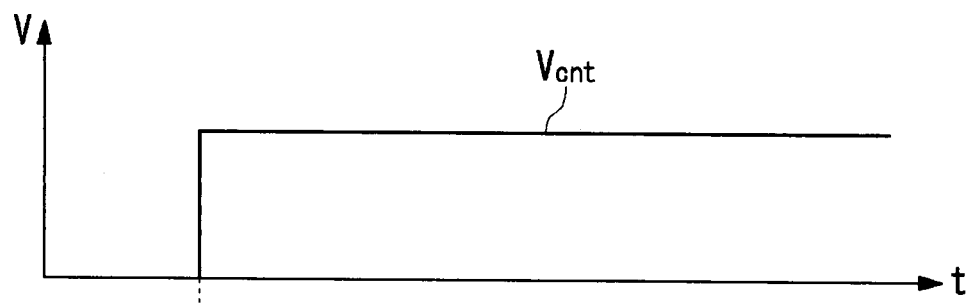
FIGS. 3A to 3D each show a temporal waveform of voltage at each terminal when a timer circuit is used in the power supply apparatus of FIG. 1.
Figure 3B:
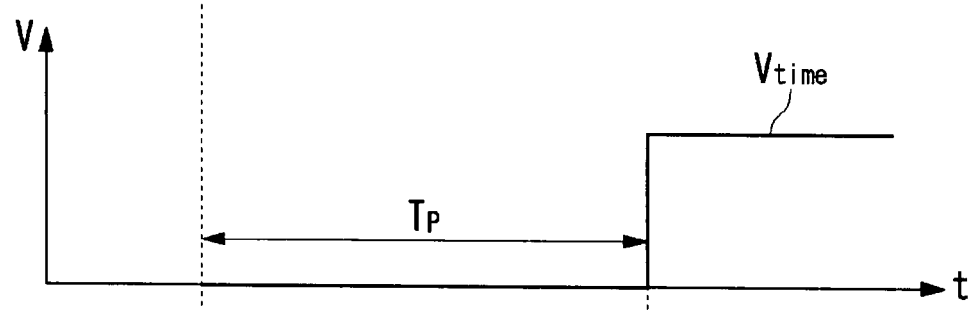

When the control signal Vcnt goes to a high level, the timer circuit 18 starts the measurement of time. As shown in FIG. 3B, the timer circuit 18 outputs a low level during the lapse of a predetermined time Tp from time T1. During this time, as with time T0 to time T1, a constant voltage Vreg is supplied from the linear regulator 16 to the power supply terminal 30 of the control circuit 20.

At time T2 after the lapse of a fixed time Tp from time T1, the output signal Vtime of the timer circuit 18 goes to a high level. With the output signal Vtime of the timer circuit 18 reaching high level, the switch SW1 turns on and at the same time a low level is inputted to the enable terminal EN of the linear regulator 16, thus stopping the operation thereof.

Figure 3C:
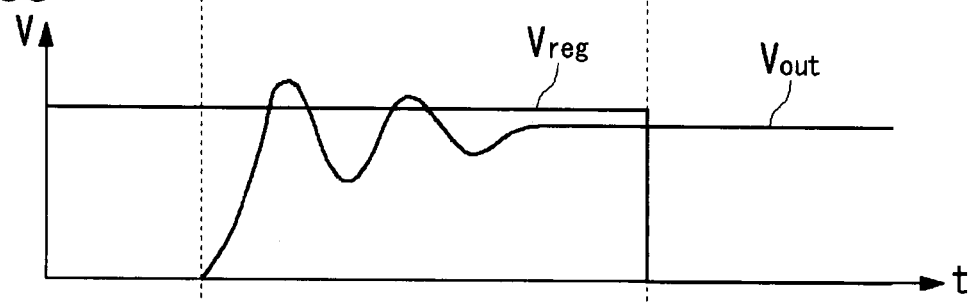
Figure 3D:
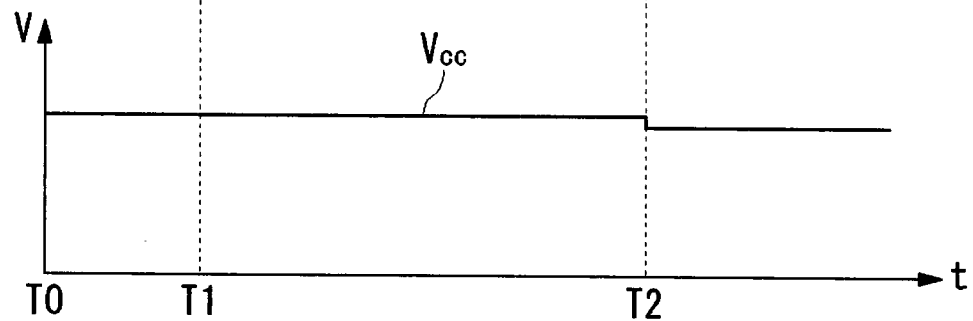

As a result, an output voltage Vout is applied to the power supply terminal 30 of the control circuit 20, and, as shown in FIG. 3D, Vcc=Vout at time T2 and thereafter.

As described above, the power supply apparatus 100 according to the present embodiment generates a stable voltage Vreg by the linear regulator 16 at the time of starting when a overshooting and ringing may possibly take place and thus uses this as the supply voltage Vcc for the control circuit 20. Then, after the output voltage Vout of the switching regulator 10 has stabilized, the supply voltage Vcc of the control circuit 20 is switched over to the output voltage Vout. As a result, as shown in FIG. 3D, the supply voltage Vcc of the control circuit 20 takes a constant value, so that any steep changes of the supply voltage Vcc due to the variation in the output voltage Vout at the start can be suppressed and the circuit can be operated stably.

A not-shown capacitor for smoothing may be provided between the power supply terminal 30 of the control circuit 20 and the ground. By this smoothing capacitor, the change in voltage at the switching of the supply voltage Vcc of the control circuit 20 can be smoothed.

The power conversion efficiency for the generation of the output voltage Vout from the input voltage Vin by the switching regulator 10 is higher than that for the generation of the voltage Vreg from the input voltage Vin by the linear regulator 16. Hence, during the period when the output voltage Vout is supplied as the supply voltage Vcc of the control circuit 20, the efficiency of the power supply apparatus 100 as a whole can be improved.

It is to be noted that, in FIGS. 2A and 2B and FIGS. 3A to 3D, the voltage Vreg and the output voltage Vout after stabilization are depicted as those of different voltage values for clarity of representation, but they may, in practice, be nearly equal voltage values.

The output voltage Vout is stabilized by feedback. Hence, once the output voltage Vout is stabilized, the subsequent variation in the voltage value, if any, has a narrower width of variation than the overshooting or ringing occurring at the time of starting, so that there is not much variation in the supply voltage Vcc of the control circuit 20 and thus there is no significant effect on the operation of the circuit.

Second Embodiment

Figure 4:
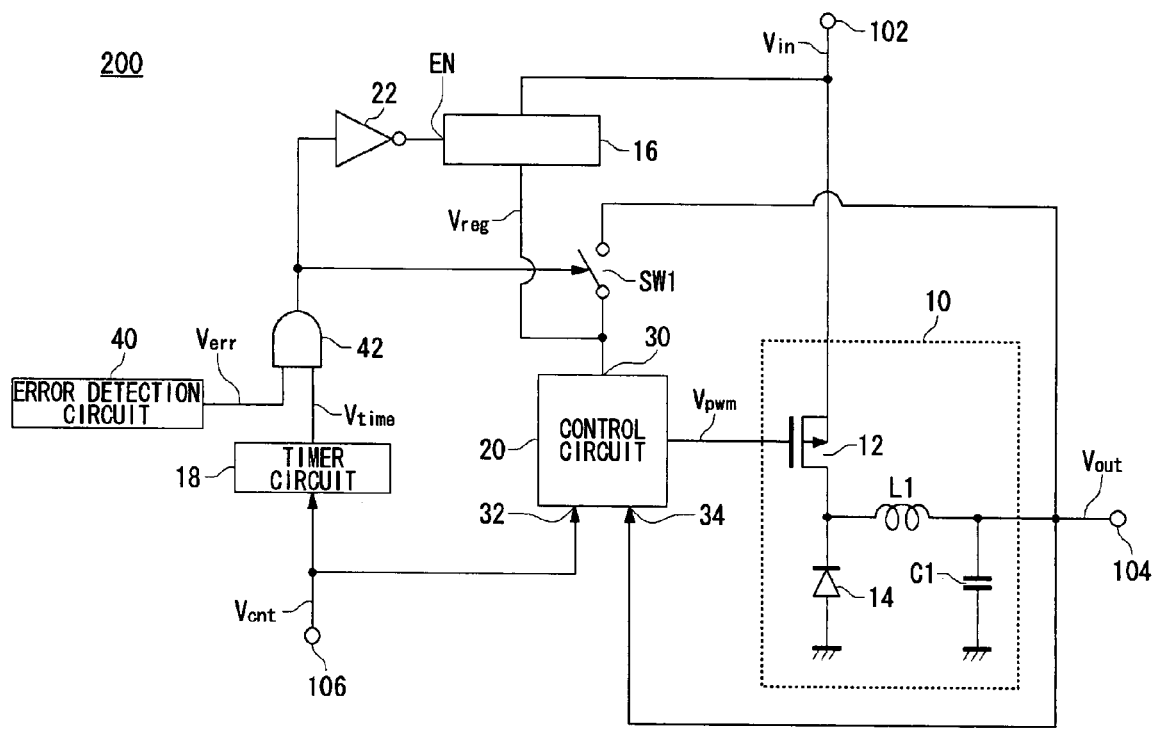
FIG. 4 shows a structure of a power supply apparatus according to a second embodiment of the present invention.

FIG. 4 shows a power supply apparatus 200 according to a second embodiment. The power supply apparatus 200 is provided with an error detection circuit 40 that detects abnormal operations of the power supply apparatus. Hereinbelow, a description will be given of a power supply apparatus 200 according to the second embodiment, centering around the differences from the power supply apparatus 100 according to the first embodiment.

The power supply apparatus 200 includes a switching regulator 10, a switch SW1, a linear regulator 16, a control circuit 20, a timer circuit 18, an error detection circuit 40, an AND circuit 42, and an inverter 22.

The error detection circuit 40 is a circuit which detects, for instance, output voltage errors, such as overvoltage, output current errors, such as overcurrent, overheating errors, and the like, and an error signal Verr, which is the output thereof, is at a high level at normal times and goes down to a low level when an error is detected.

Connected to the two input terminals of the AND circuit 42 are the output of the timer circuit 18 and the output of the error detection circuit 40. The output signal of the AND circuit 42 is at high level when the output signal Vtime of the timer circuit 18 and the error signal Verr of the error detection circuit 40 are both at high level. Accordingly, the AND circuit 42 outputs a high level at normal times when the fixed time Tp has elapsed from the starting and at the same time no error is detected by the error detection circuit 40.

When a high level is outputted from the AND circuit 42, the switch SW1 turns on and the operation of the linear regulator 16 stops, so that an output voltage Vout is supplied to the power supply terminal 30 of the control circuit 20. Conversely, during the period when a low level is being outputted from the AND circuit 42, a voltage Vreg generated by the linear regulator 16 is supplied to the power supply terminal 30 of the control circuit 20.

Even after the stabilization of the output voltage Vout at time T2 and thereafter as shown in FIG. 3C, there are cases where the output voltage Vout changes due to a sudden increase or decrease of the output current. On such occasions, according to the power supply apparatus 200 of the second embodiment as structured above, the output current is monitored by the error detection circuit 40 and the supply voltage Vcc of the control circuit 20 is supplied from the linear regulator 16 by setting the error signal Verr to low level by the error detection circuit 40, so that the stability of the circuit can be maintained. The error detection circuit 40 may monitor not only the output current but also heating error and output voltage.

Further, the error detection circuit 40 may not only set the error signal Verr to low level during the period when an error is being detected, but also, with a latch function provided, may be so designed as to set the error signal Verr to low level for a predetermined fixed period from the moment of detection. It is preferable that this certain period of time is a period from the occurrence of a malfunction to the time when the circuit is sufficiently stabilized.

When the output voltage Vout is monitored by the error detection circuit 40, a voltage Vreg generated by the linear regulator 16 is used as the supply voltage Vcc of the control circuit 20 should an overvoltage occur, thereby preventing the application of the overvoltage to the power supply terminal 30 of the control circuit 20 and reducing the effects on the malfunction or reliability of the circuit.

According to the present embodiment, the efficiency of the power supply apparatus 200 as a whole can also be improved during the period when the output of the AND circuit 42 is at high level and the output voltage Vout is supplied as the supply voltage Vcc of the control circuit.

These embodiments are merely exemplary, and it is understood by those skilled in the art that various modifications to the combination of each component and process thereof are possible and that such modifications are also within the scope of the present invention.

In the embodiments, the high level and the low level of the logic signals, such as Vtime, Verr, and Vcnt, that determine the operations of the respective circuits may be changed as necessary. For example, if a P-type MOSFET is used for the switch SW1, a high level must be inputted as a gate voltage to turn off the switch, and therefore it is necessary to control by the inverted logic. Also, the outputs of such other circuits as the timer circuit 18 and the error detection circuit 40 may be inverted, respectively; the design may be such that similar operations are carried out by a combination of logic circuits.

In the embodiments, a description has been given of a switching regulator of a diode rectification method which uses a rectifying diode 14 as the switching regulator 10. However, it may be replaced by a transistor for synchronous rectification. Also, a step-up and step-down type charge-pump circuits using a switched capacitor may be used in place of the switching regulator 10.

In the embodiments, the switch SW1 may be used as a linear regulator. With the switch SW1 used as a linear regulator, the supply voltage Vcc can be maintained at a fixed value even when there is a variation in the output voltage Vout during the time when the output voltage Vout of the switching regulator 10 is being selected as the supply voltage Vcc of the control circuit 20, thus assuring a stabler operation of the circuit.

In the present embodiments, the elements constituting the power supply apparatus 100 or the power supply apparatus 200 may all be integrated in a package, or some of them may be comprised of discrete parts. Which of the parts is to be integrated may be determined in consideration of the cost or the area to be occupied.

While the preferred embodiments of the present invention have been described using specific terms, such description is for illustrative purposes only, and it is to be understood that changes and variations may be made without departing from the spirit or scope of the appended claims.

What is claimed is:

1. A power supply apparatus, comprising:
a switching regulator which includes a switching transistor therein and which converts an input voltage to a desired output voltage by a switching operation of the switching transistor and outputs the voltage through an output terminal thereof;
a control unit which controls the switching operation of the switching transistor, and receives a power supply voltage at a power supply terminal;
a voltage generation circuit which supplies a supply voltage to the power supply terminal of said control unit, to drive said control unit;
a switch which is provided between the output terminal of the switching regulator and the power supply terminal of the control unit; and a timer circuit which measures time elapsed from a start of operation of the switching transistor and which turns on the switch by varying an output thereof when a predetermined period of time has elapsed, wherein said control unit is driven by the supply voltage supplied from said voltage generation circuit during a period before the output of said timer circuit changes, whereas said control unit is driven by the output voltage of said switching regulator during a period after the output of said timer circuit has changed, the voltage generation circuit is provided with an enable terminal operative to receive an enable signal determined by the output of the timer circuit, and the voltage generation circuit is placed in an enable state before the output of the timer circuit varies, and is placed in a disabled state after the output of the timer circuit varies.

2. A power supply apparatus according to claim 1, wherein the predetermined period of time measured by said timer circuit is determined in relation to a period required until when the output voltage of said switching regulator becomes stable.

3. A power supply apparatus according to claim 1, wherein said voltage generation circuit is a linear regulator that steps down the input voltage and outputs it.

4. A power supply apparatus according to claim 1, further comprising an error detection circuit which detects an error in circuit operation, wherein when the error is detected by said error detection circuit, said control unit is driven by the supply voltage supplied from said voltage generation circuit.

5. A power supply apparatus according to claim 2, further comprising an error detection circuit which detects an error in circuit operation, wherein when the error is detected by said error detection circuit, said control unit is driven by the supply voltage supplied from said voltage generation circuit.

6. A power supply apparatus according to claim 3, further comprising an error detection circuit which detects an error in circuit operation, wherein when the error is detected by said error detection circuit, said control unit is driven by the supply voltage supplied from said voltage generation circuit.

7. A power supply apparatus according to claim 1, further comprising an error detection circuit which detects an error in circuit operation, wherein when the error is detected by said error detection circuit, said control unit is driven by the supply voltage supplied from said voltage generation circuit.

8. A power supply apparatus, comprising:

a switching regulator which includes a switching transistor therein and which converts an input voltage to a desired output voltage by a switching operation of the switching transistor and outputs the voltage;

a control unit which controls the switching operation of the switching transistor;

a voltage generation circuit which supplies a supply voltage to said control unit, to drive said control unit;

a switch provided between an output terminal of the switching regulator and a power supply terminal of the control unit;

a timer circuit which measures time elapsed from a start of operation of the switching transistor and which varies an output thereof when a predetermined period of time has elapsed, wherein said control unit is driven by the supply voltage supplied from said voltage generation circuit during a period before the output of said timer circuit changes, whereas said control unit is driven by the output voltage of said switching regulator during a period after the output of said timer circuit has changed, the voltage generation circuit is provided with an enable terminal operative to receive an enable signal determined by the output of the timer circuit, and the voltage generation circuit is placed in an enable stated before the output of the timer circuit varies, and is placed in a disabled state after the output of the timer circuit varies.

9. A power supply apparatus according to claim 8, wherein the predetermined period of time measured by said timer circuit is determined in relation to a period required until when the output voltage of said switching regulator becomes stable.

10. A power supply apparatus according to claim 9, wherein said voltage generation circuit is a linear regulator that steps down the input voltage and outputs it.

11. A power supply apparatus according to claim 8, further comprising an error detection circuit which detects an error in circuit operation, wherein when the error is detected by said error detection circuit, said control unit is driven by the supply voltage supplied from said voltage generation circuit.

12. A power supply apparatus according to claim 9, further comprising an error detection circuit which detects an error in circuit operation, wherein when the error is detected by said error detection circuit, said control unit is driven by the supply voltage supplied from said voltage generation circuit.

13. A power supply apparatus according to claim 10, further comprising an error detection circuit which detects an error in circuit operation, wherein when the error is detected by said error detection circuit, said control unit is driven by the supply voltage supplied from said voltage generation circuit.

14. A power supply apparatus according to claim 8, further comprising an error detection circuit which detects an error in circuit operation, wherein when the error is detected by said error detection circuit, said control unit is driven by the supply voltage supplied from said voltage generation circuit.

* * * * *